United States Patent
Harris et al.

(10) Patent No.: US 8,262,383 B2
(45) Date of Patent: Sep. 11, 2012

(54) TWISTED PANEL AND APPARATUS FOR MAKING OR MOUNTING SAME

(75) Inventors: Bryan Harris, Farmington, UT (US); Kevin Fisher, Erda, UT (US); Jeremy Porter, Salt Lake City, UT (US); Venugopal R. Ghatikar, Salt Lake City, UT (US); Guillaume Martin, Villecresnes (FR)

(73) Assignee: 3form, Inc., Salt Lake City, UT (US)

( * ) Notice: Subject to any disclaimer, the term of this patent is extended or adjusted under 35 U.S.C. 154(b) by 1419 days.

(21) Appl. No.: 11/817,003

(22) PCT Filed: Jul. 10, 2007

(86) PCT No.: PCT/US2007/073171
§ 371 (c)(1),
(2), (4) Date: Aug. 23, 2007

(87) PCT Pub. No.: WO2008/008788
PCT Pub. Date: Jan. 17, 2008

(65) Prior Publication Data
US 2009/0305072 A1    Dec. 10, 2009

Related U.S. Application Data

(60) Provisional application No. 60/807,034, filed on Jul. 11, 2006, provisional application No. 60/946,120, filed on Jun. 25, 2007.

(51) Int. Cl.
*B28B 11/08* (2006.01)
(52) U.S. Cl. .......... 425/391; 269/60; 269/271; 29/281.1
(58) Field of Classification Search .................. 160/131, 160/132, 332, 405, 236; 49/197, 199; 52/39, 52/243.1, 857, 311.1; 29/281.1; 428/222, 428/28; 264/295, 322, 339; 269/74, 55, 269/60, 75, 289 R, 271; 425/391, 402, 403.1
See application file for complete search history.

(56) References Cited

U.S. PATENT DOCUMENTS

| | | | | |
|---|---|---|---|---|
| 1,976,093 A * | 10/1934 | Raymond | ............ | 428/28 |
| 2,148,990 A * | 2/1939 | Jordan | ............ | 428/28 |
| 2,173,275 A * | 9/1939 | Houmere | ............ | 160/89 |
| 2,214,410 A * | 9/1940 | Evans | ............ | 40/431 |
| 2,377,042 A * | 5/1945 | Rosenthal | ............ | 428/398 |
| 2,390,567 A * | 12/1945 | Williams | ............ | 264/339 |
| 2,464,657 A * | 3/1949 | Stephenson | ............ | 493/338 |
| 2,611,426 A * | 9/1952 | Randall | ............ | 160/176.1 V |
| 2,636,556 A * | 4/1953 | Light et al. | ............ | 160/11 |
| 3,240,260 A * | 3/1966 | Rabinow | ............ | 160/176.1 V |
| 3,430,373 A * | 3/1969 | Shaffer | ............ | 40/430 |
| 4,596,083 A * | 6/1986 | Thompson | ............ | 40/473 |

* cited by examiner

*Primary Examiner* — David Purol
(74) *Attorney, Agent, or Firm* — Workman Nydegger

(57) ABSTRACT

A twisted resin panel of typically several feet in length can be twisted after being subject to heat, pressure, and a rotation assembly. In one implementation, a manufacturer can clamp opposing ends of a heated resin panel, such as a panel comprising a one or more layers (e.g., tie/EVA layer, image layer(s), etc.) thermoformed within opposing resin sheet layers. The manufacturer can then elevate the resin panel, and then twist at least one end of the resin panel to a specified degree to achieve a desired aesthetic. Upper securing means (e.g., vertical clamps, rig hardware) at the upper end of the resin panel can be configured to move up or down during the twist of the resin panel in order to accommodate length variations thereof. Upon twisting, the resin panel will then cool into the desired position, and thus be used for any number of decorative architectural purposes.

21 Claims, 9 Drawing Sheets

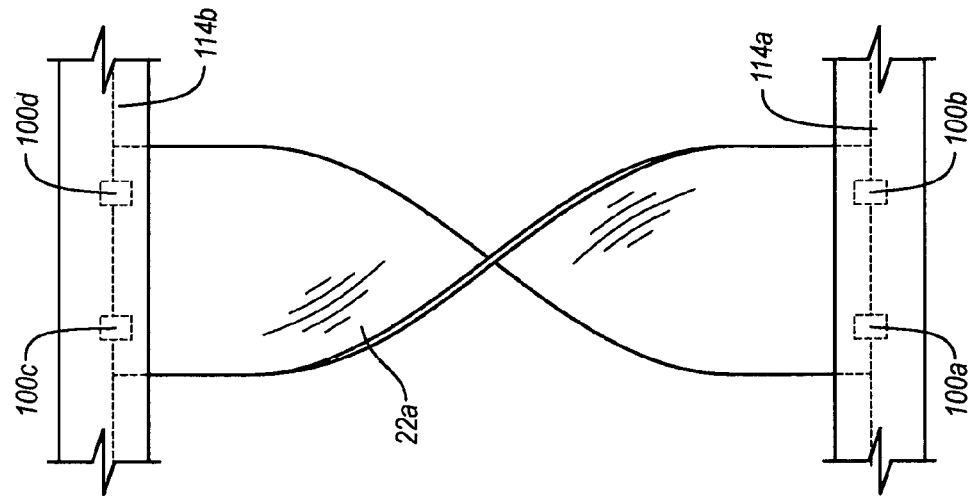
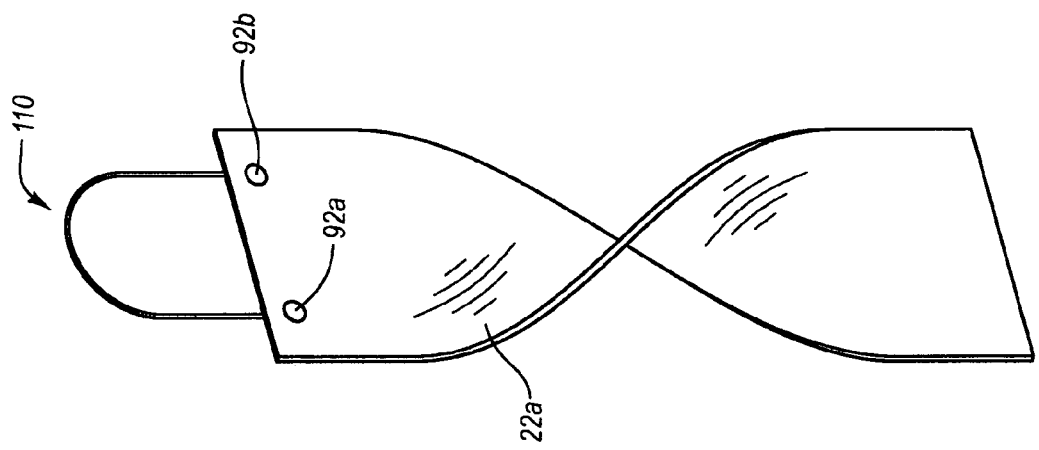
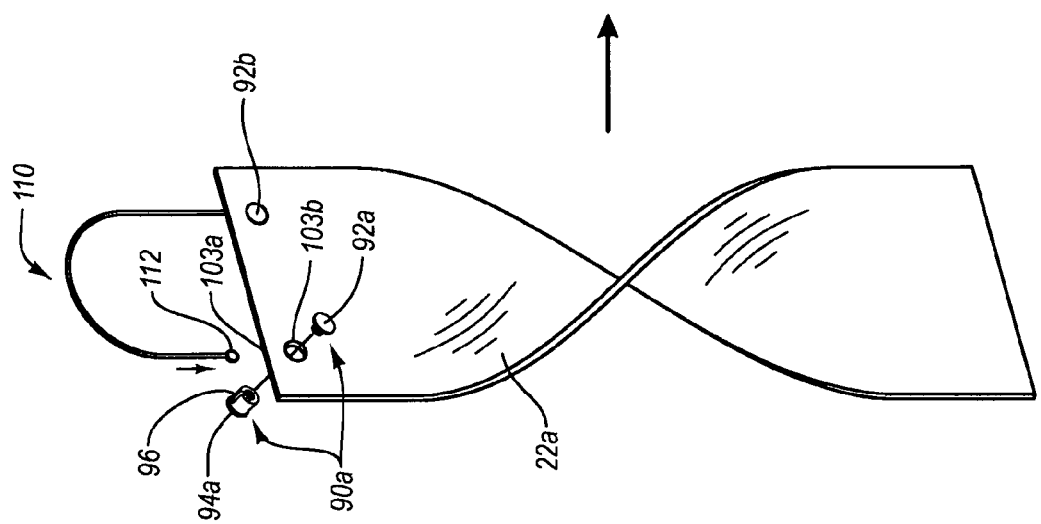

TWISTED PANEL AND APPARATUS FOR MAKING OR MOUNTING SAME

CROSS-REFERENCE TO RELATED APPLICATIONS

This application is U.S. National Stage Patent Application corresponding to PCT Application No. PCT/US07/73171, filed on Jul. 10, 2007, entitled "TWISTED PANEL AND APPARATUS FOR MAKING OR MOUNTING SAME," which claims the benefit of priority to U.S. Provisional Patent Application No. 60/807,034, filed on Jul. 11, 2006, entitled "TWISTED PANEL AND METHODS OF MAKING SAME," and to U.S. Provisional Patent Application No. 60/946,120, filed Jun. 25, 2007, entitled "TWISTED PANEL AND APPARATUS FOR MAKING OR MOUNTING SAME." The aforementioned applications are incorporated herein by reference in their entirety.

BACKGROUND OF THE INVENTION

1. The Field of the Invention

Implementations of the present invention relate to resin panels for use in decorative and/or structural architectural applications.

2. Background and Relevant Art

Some recent architectural designs have implemented synthetic, polymeric resins, which can be used as windows, ceiling panels, partitions, walls, etc., in offices and homes. Present polymeric resin-based materials generally used for creating decorative resin-based panels comprise polyvinyl chloride or "PVC" materials; polyacrylate materials such as acrylic, and poly(methylmethacrylate) or "PMMA;" polyester materials such as poly(ethylene terephthalate), or "PET;" poly(ethylene terephthalate modified with a compatible glycol such as 1,4-dimethanol or 2,2-dimethyl-1,3-propanediol) or "PETG" (or "PCTG"); as well as polycarbonate materials.

In general, resin-based materials such as these are now popular compared with decorative cast glass or laminated glass materials. This is due in part to the fact that resin-based materials can be manufactured to be more resilient, and to have a similar transparent, translucent, or colored appearance as cast or laminated glass, but with less cost. Decorative resin-based panels can also provide more flexibility, compared with glass, in terms of color, texture ability, gauge availability, lower material density (implying lower panel weight) and considerably higher impact resistance. Furthermore, decorative resin-based panels have a fairly wide utility since they can be manufactured and fabricated to include a wide variety of artistic colors and images. This stated flexibility applies both in the manufacturing phase, as well as in the post-manufacturing, or ultimate-use, phase.

From a combined functional and decorative aspect, one application of polymeric resins in architectural environments is that of a decorative panel, which can be used as any of an existing wall, an interior wall or ceiling finish, or as a new wall partition. For example, a 4x8 foot resin-based panel could be used as a partition wall by inserting the resin-based panel inside a wood, plastic or metal frame that has bottom, side, and top grooves for holding the resin-based panel securely. If the resin-based panel is translucent, the resin-based panel might also be formed with decorative materials (internally or externally), which could provide additional creative features to the partition or interior finish. Light transmitted on either side of the wall will provide an aesthetic effect to viewers on the opposing side. The polymeric resins may also be adhered directly to the wall for another decorative and/or structural effect.

Generally, the above-mentioned applications tend to incorporate flat or substantially flattened resin materials. Another use of polymeric resins in architectural environments, however, includes displaying bent resin panels. For example, the pliability of some polymeric resin panels allows a manufacturer to bend a resin panel somewhat, so that the resin panel imparts additional decorative effects. In particular, the manufacturer might insert two opposing ends of a resin panel into opposing vertical structural supports, which, in turn, are closer together in spacing than the length of the resin panel. This, and other structural configurations, can cause the resin panel to bend into any number of shapes after formation (e.g., thermoforming, thermosetting, etc.) of the resin panel. In other cases, such as during formation of the resin panel, the manufacturer could form the resin panel about one or more specifically designed molds, and thereby impart more complex bends and slight twists to the resin panel. This is generally done by resting a softened (or "malleable") resin panel about one or more molds, and then cooling the resin panel in position.

Unfortunately, these methods and or apparatus for adding shape to a resin panel cannot generally be used in an effective way to impart a twisting shape to a resin panel, such that opposing ends of a resin panel twist at about 90° or more with respect to each other. For example, it is difficult if not impossible to impart a twist to a resin panel longer than about 4 feet while the panel is still hot simply by resting a hot resin panel on top of various forms or molds in a single formation step. This is beside the fact that resin panels that may be hot enough to twist are also typically too hot to handle in the first place. By contrast, although a manufacturer can bend to some extent a resin panel that has cooled somewhat after its formation, the structural integrity of a cooled resin panel prohibits full twisting, at least in a manner that would avoid damaging the resin panel.

Accordingly, there are a number of difficulties in the art with respect to bending, twisting, or otherwise shaping resin panels that can be addressed.

BRIEF SUMMARY OF THE INVENTION

Implementations of the present invention solve one or more of the foregoing problems in the art with systems, apparatus, and methods that can be used to create large-scale twisted resin panels (and partitions of one or more twisted resin panels). In particular, implementations of the present invention comprise systems of components that can be used to assemble, lift, and twist large-scale twisted resin panels. In addition, implementations of the present invention relate at least in part to methods for assembling resin panels, heating resin panels, lifting resin panels, and twisting resin panels. The twisted resin panels can be used in a wide range of decorative architectural settings as decorative architectural partitions, or even as structural or aesthetic wall, ceiling, or floor treatments.

For example, at least one implementation of a partition in accordance with an implementation of the present invention can include one or more resin panels that are at least about 4 feet in length in one dimension, and at least about 1 foot in length in a perpendicular dimension. In this case, at least one end of the one or more resin panels has been rotated with respect to an opposing end of the one or more resin panels, such that the one or more resin panels display a twist aesthetic.

In addition, at least one implementation of a resin panel rotation assembly for twisting a resin panel can include a resin panel that includes a resin sheet of at least about 4 feet in length in one dimension, and at least about 1 foot in length in a perpendicular dimension. The rotation assembly can also include a rotator plate mounted to a support surface. In addition, the rotation assembly can include a rotator clamp mounted to one end of the at least one unitary resin panel on one end, and further rotatably mounted to the rotator plate. Furthermore, the rotation assembly can include lifting means mounted to an opposing end of the at least one unitary resin panel.

Similarly, one implementation of a method of preparing a twisted resin panel can involve heating a resin panel that is at least about 4 feet in one dimension and at least about 1 foot in a perpendicular dimension to a temperature between about 150° to 260° F. In this case, at least a portion of the resin panel between two opposing ends is malleable. The method can also involve clamping one of the opposing ends of the resin panel with a rotator clamp, and another of the opposing ends with a stationary clamp. In addition, the method can involve raising the stationary clamp to an elevated position over a rotator plate. The stationary clamp is raised and positioned in a horizontally-secure position. Furthermore, the method can involve rotating the rotator clamp with respect to the rotator plate.

Accordingly, implementations of the present invention provide a number of advantages to builders and/or architects looking to provide decorative architectural effects with resin panels. In addition to imparting complex twisting patterns, such aesthetic properties can also include variations in color, texture, inclusion of different types of decorative objects, as well as differing shapes. In addition, the panels and systems described herein can also be made to add fire resistance properties to the resin panels, such as may be needed in certain types of manufacturing or building environments as sometimes required by building officials or local building codes.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 7A illustrates an exploded view of the twisted panel as it is being mounted using the hanger apparatus shown in FIG. 6A;

FIG. 7B illustrates a final view of the twisted panel and hanger apparatus of FIG. 7A after mounting the resin panel; and FIG. 7C illustrates a facing view of a twisted panel when mounted to an upper and lower substrate using the U-shaped mounting member of FIG. 6B.

DETAILED DESCRIPTION OF THE PREFERRED EMBODIMENTS

Figure 1A:
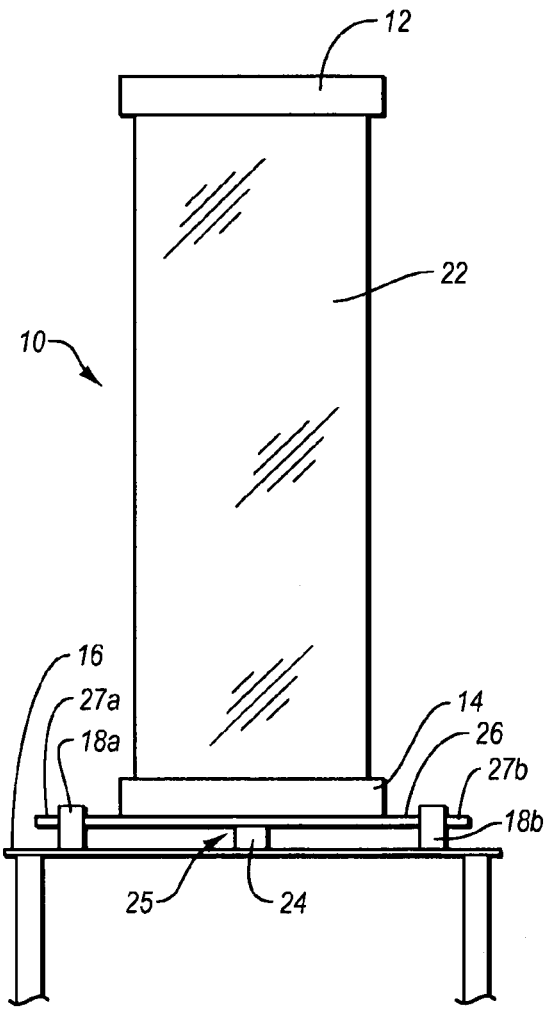
FIG. 1A illustrates a panel twisting apparatus and resin panel in accordance with an implementation of the present invention prior to twisting.

Implementations of the present invention extend to systems, apparatus, and methods that can be used to create large-scale twisted resin panels (and partitions of one or more twisted resin panels). In particular, implementations of the present invention comprise systems of components that can be used to assemble, lift, and twist large-scale twisted resin panels. In addition, implementations of the present invention relate at least in part to methods for assembling resin panels, heating resin panels, lifting resin panels, and twisting resin panels. The twisted resin panels can be used in a wide range of decorative architectural settings as decorative architectural partitions, or even as structural or aesthetic wall, ceiling, or floor treatments.

Accordingly, implementations of the present invention provide a number of advantages to builders and/or architects looking to provide unique, structural components in a building environment. In general, a resin panel (e.g., 22) that is used herein will generally comprise two or more opposing resin sheets (e.g., PETG, PET, PCTG, Polycarbonate, Acrylic, or the like) that have been thermoformed or thermoset together. Of course, it is not necessary for the resin panel to comprise multiple layers in all cases. In some cases, for example, the resin panel can comprise a unitary sheet of polymeric material, or at least have the appearance of a unitary sheet of polymeric material (e.g., after a thermoforming/ thermosetting process). In any event, the resin panel will generally be at least about 4-5 feet in length (from about 4-13 feet), at least about 1 foot (from about 0.5 to 3 feet) in width, and at least from about 0.5 to about 1.5 inches in thickness.

In addition to these dimensions, the resin panel 22 used herein can include any number of additional components, which have both functional as well as decorative purposes. For example, and as well be discussed more fully herein, at least one implementation of a resin panel comprises a plurality of layers that include one or more films of Ethylene Vinyl Acetate (or "EVA," or "tie" layer) positioned between resin sheets (e.g., before heating and/or pressurizing the resin sheets). In additional or alternative implementations, a resin panel used herein can also include one or more decorative image layers positioned between or otherwise about/adjacent the opposing resin sheet(s) (e.g., before heating and/or pressurizing the resin sheets). In such a case, the decorative image layer(s) can include any number of colored films, in addition (or alternatively to) to any natural, botanical, synthetic, or textile-based image layers (including multiple objects, or even unitary film layers).

When a resin panel is to include multiple different layers, a manufacturer can first assemble the various layers into a laminate assembly. In one implementation, the manufacturer can do so by assembling a first resin sheet, a tie layer, a second resin sheet, and potentially also a decorative image layer (e.g., natural or synthetic objects, color films, etc.) into a "sandwich" (not shown). The manufacturer can then heat the laminate assembly in a first step to as much as from about 150° F. to about 250° F., preferably 200° F. This initial heating step is generally sufficient to bond the plurality of layers together (and thus create a thermoformed "resin panel"), particularly when using the tie layer. After preparing the bonded resin panel or multiple layers, or if initially using a single resin sheet as the resin panel, the manufacturer will also heat the resin panel in a second heating step to ensure the resin panel is sufficiently hot for twisting.

In one implementation, for example, the manufacturer heats the resin panel to as high as from about 210° F. to about 260° F. When using PETG materials in the resin panel, for example, a temperature of about 230° F. will make the resin panel sufficiently malleable for twisting. One will appreciate, however, that other temperatures (or ranges of temperatures) may be more appropriate for different types of resin sheet materials. For example, a higher range of temperatures may be more appropriate for resin panels comprising one or more polycarbonate sheets (rather than—or, in addition to—PETG). In either case, these types of temperatures are typically too hot for direct, manual handling, and so the manufacturer may also need to cool the extreme ends of the resin panel before twisting.

In at least one implementation, for example, the manufacturer can cool the extreme ends of the resin panel in order to apply stationary and/or rotator clamps (12 and 14, FIGS. 1-5C), such as described more fully herein. To do so, the manufacturer can pass the opposing ends of the resin panel 22 through a cooling apparatus (not shown), such as a cooling apparatus that implements one or more water tubs with running/circulating tap water. Before positioning the opposing ends in the water tubs, the manufacturer may also position one or more contact pads on the ends of the resin panels. The running water thus cools the contact pads of the resin panel, and ultimately the panel ends. Once the ends are sufficiently cool to apply the clamp apparatus, and the resin panel is still otherwise sufficiently hot in the middle portions for twisting, the manufacturer can then apply the clamp apparatus and position the resin panel for twisting, as described more fully below.

Figure 1B:
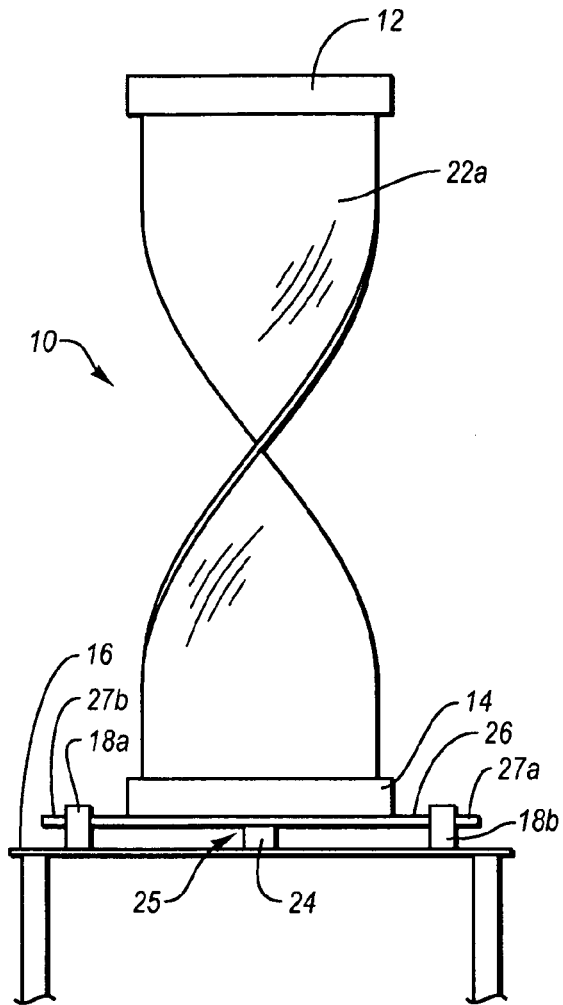
FIG. 1B illustrates the panel twisting apparatus according to FIG. 1A after twisting.

For example, FIGS. 1A and 1B illustrate overview schematic diagrams of one or more components in a system 10 for imparting one or more twist aesthetics to resin panels 22. In particular, FIG. 1A illustrates that system 10 can comprise at least a stationary clamp 12, a rotator clamp 14, a rotator plate 16, stopping means 18a-18b, a spindle assembly 25, and a rotator handle 26. These components, in turn, are positioned about (or otherwise used) to twist one or more resin panels 22. For example, FIG. 1A shows that, in this example, stationary clamp 12 is mounted to an uppermost portion of a resin panel 22, while rotator clamp 14, which includes rotator handle 26, is mounted to a lowermost portion of the resin panel 22. One will appreciate, however, that the designations of "uppermost" and "lowermost" are generally arbitrary, and that, in some cases, the rotator clamp may alternatively be used in an uppermost position, and so forth.

In any event, FIG. 1A also shows that the manufacturer has secured rotator handle 26 to stopping means 18a and 18b in one particular orientation. As will be understood more fully herein, the manufacturer can impart a twist aesthetic (rotator clamp moved in an arcuate direction with respect to the stationary clamp) by moving the stopping means 18 along a variety of different positions along rotator plate 16, and securing rotator handle 26 therein. In other cases, the manufacturer may simply move the rotator handle 26 into another stopping means 18 location without necessarily moving the stopping means 18.

For example, FIG. 1A shows that rotator handle 26 ends 27a-b are in one position of stopping means 18(a-b) prior to twisting resin panel 22. By contrast, FIG. 1B shows that rotator handle 26 ends 27a-b are secured in an opposite stopping means 18a and 18b after one rotation, thereby creating twisted resin panel 22a. In the illustrated case, the manufacturer has applied a twist aesthetic (i.e., result of twist between opposing clamps 12 and 14 on twisted resin panel 22a) of about 180° by releasing the rotator handle 26, rotating the rotator handle 26 ends 27 to an opposing stopping means, and securing the rotator ends 27 in the new position. Of course, in other cases, the manufacturer may first move the stopping means 18(a-b) to a particular position along rotator plate 16, and then (or at the same time) reposition the rotator handle 26 therein.

Figure 2:
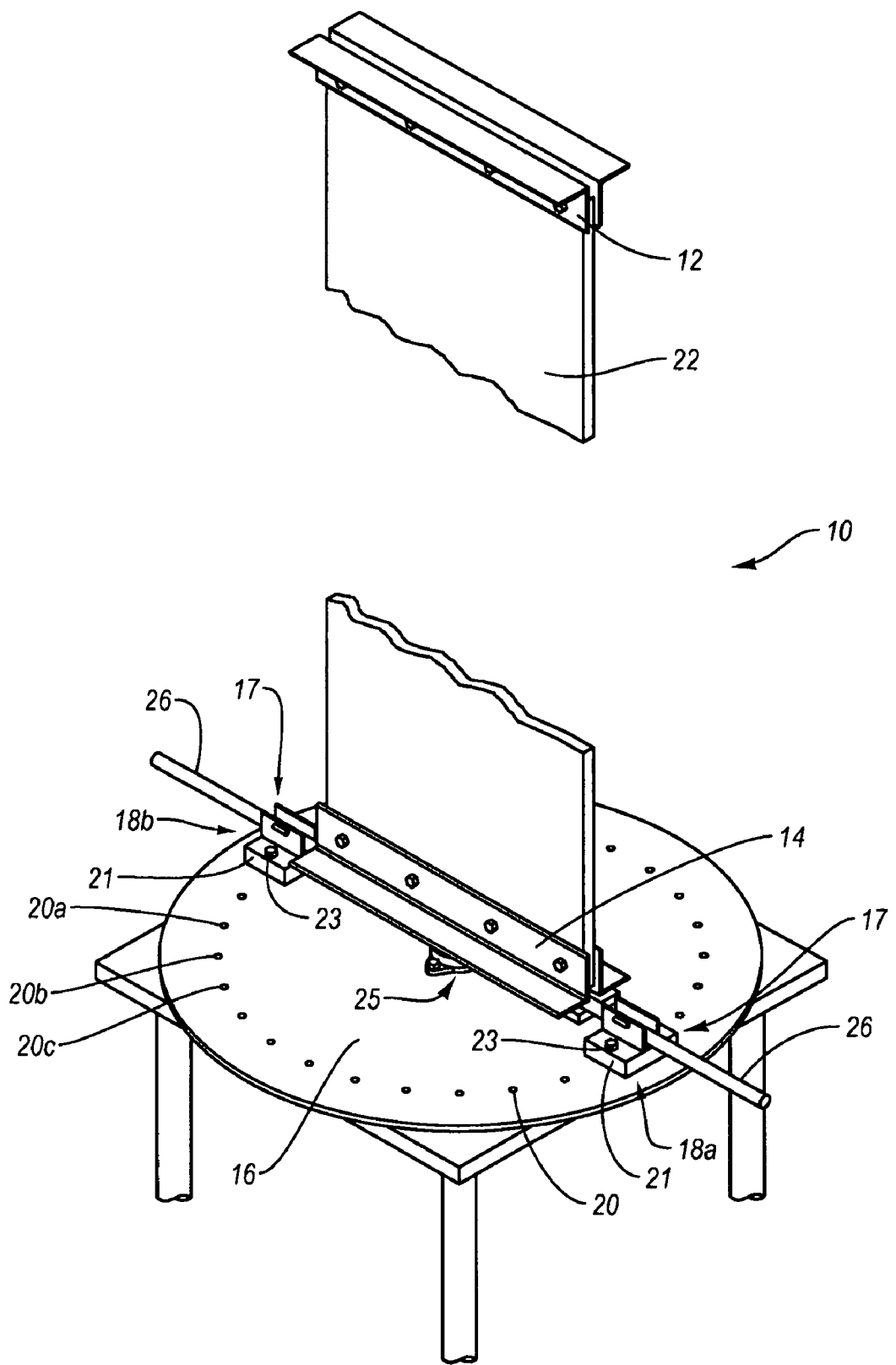
FIG. 2 illustrates a perspective view of a panel twisting apparatus in accordance with an implementation of the present invention of a rotator plate, as well as stationary and rotator clamps for securing or rotating at least one end of a resin panel.

One will appreciate, therefore, that the variability of stopping means positions and rotator twistability along rotator plate 16 can be used to impart a wide range of angular twist geometries/twist aesthetics in a resin panel 22 to create a twisted resin panel 22a. The only real limit to twist geometry is the granularity of available mounting positions along rotator plate 26. For example, FIG. 2 illustrates an upper perspective view of the panel twisting system 10, further showing a series of equally spaced perforations 20a, 20b, 20c, etc. (or recesses) in rotator plate 16. In general, perforations 20a-c, etc. are configured to receive one or more components of stopping means 18a-18b, though, in other configurations, the perforations 20 (or recesses) can be configured to receive one or more components of rotator clamp 14 (or handle 26) directly. In at least one implementation, perforations 20a-c are spaced apart from about 10° to about 20° or about every 15° along a circumference in rotator plate 16. In another implementation, the perforations 20a-c are spaced apart at about 13° (e.g., 12.5°). Of course, one will appreciate that perforations 20a-c (etc.) can be spaced apart at virtually any level of desired granularity.

Ultimately, however, and despite any granularity in spacing between perforations 20, the actual amount that the manufacturer can rotate the given resin panel 22 will depend largely on the composition (including resin types and/or included decorative materials) of the given resin panel 22. For example, a manufacturer may be able to make a number of full twists (e.g., equal to or greater than 360°) in relatively thin resin panels 22, while being able to make only partial twists (e.g., equal to or less than 360° in relatively thick resin panels 22. In at least one implementation, the resin panel 22 is of such composition, and the perforations 20 are of such spacing, that a manufacturer can rotate resin panel 22 by as much as between about 270° to about 300° or more when the resin panel is heated.

As previously mentioned, the manufacturer will typically use stopping means 18(*a-b*) to secure a portion of a resin panel (22/22*a*) with respect to any perforation. As shown in FIG. 2, at least one implementation of stopping means 18(*a-b*) can comprise at least one or more base members 21, one or more clamp members 17 (see also FIGS. 4A-4B), and one or more fasteners 23. Accordingly, to secure a stopping means 18 against any particular perforation (or set of perforations), the manufacturer first positions the base member(s) 21 about an appropriate set of one or more perforations (e.g., 20*a-c*) on rotator plate 16. Thereafter, the manufacturer secures the base member 17 to the rotator plate 16 by inserting and securing one or more fasteners 23 through both the base member(s) 21 and the corresponding perforation(s) 20.

Of course, one will appreciate that this stopping means 18 and perforation 20 assembly can be configured any number of different, additional, or alternative ways to accomplish effectively the same or similar function. In at least one implementation, for example, rotator plate 16 comprises a circumferential track about which a manufacturer can rotate rotator handle 26 and rotator clamp 14 upon lifting handle 26 and clamp 14. For example, the rotator handle 26 may be connected to rotator plate 16 through a combination of wheels and spring biases (not shown). The perforations 20, in turn, can comprise recesses or perforations similar to those shown in FIGS. 1A-2, and the rotator handle 26 ends 27*a-b* comprise one or more extensions (not shown) configured to rest in a corresponding recess upon application of the spring bias.

In this type of assembly, therefore, the manufacturer can simply lift the rotator handle 26 out of a set of opposing recesses (e.g., opposed by 180°) and against the spring bias. The manufacturer can then rotate the rotator handle 26 to another set of recesses, and rest the extensions of handle 26 (or clamp 14) ends 27*a-b* to secure the rotator clamp 14. Accordingly, one will appreciate that there are a variety of means and mechanisms for rotating and securing a rotator clamp 14 with respect to a rotator plate 16, and that the present Figures are examples of only one such embodiment.

Figure 3A:
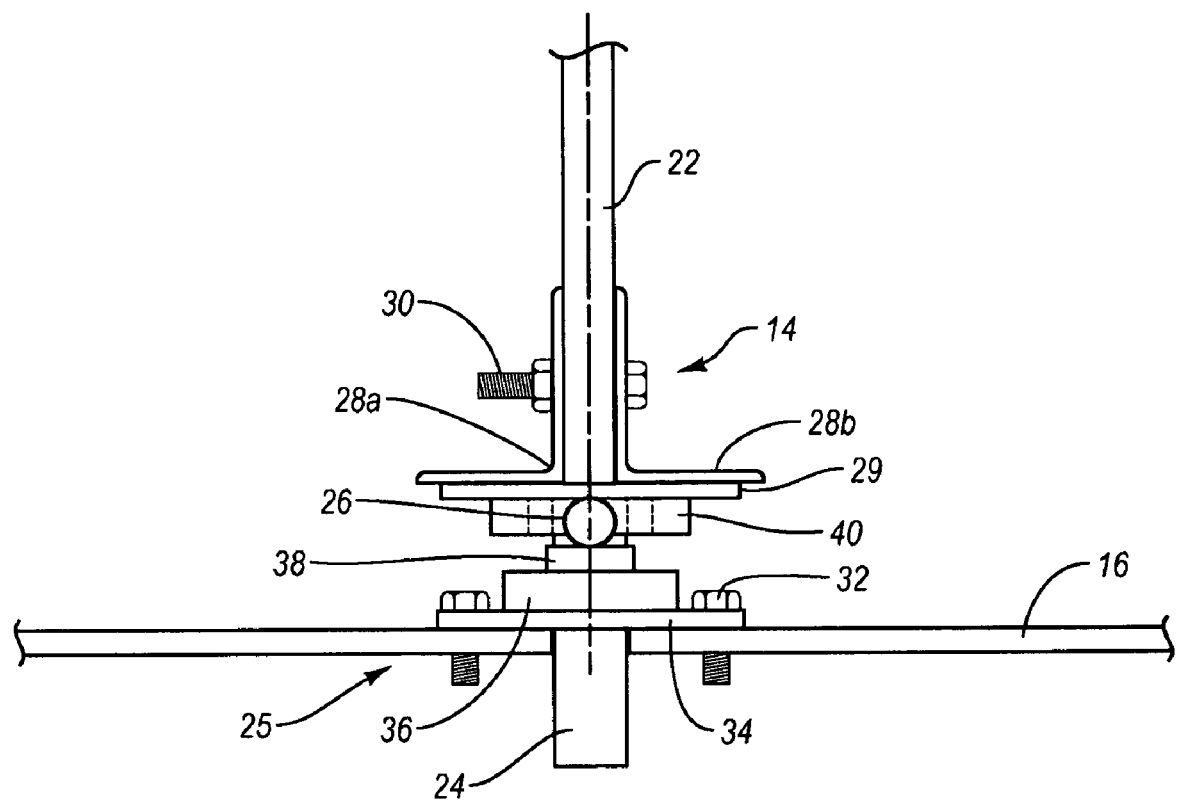
FIG. 3A illustrates a cut-away view of one implementation of a rotator clamp as it can installed on the rotator plate shown in FIG. 2A.
Figure 3B:
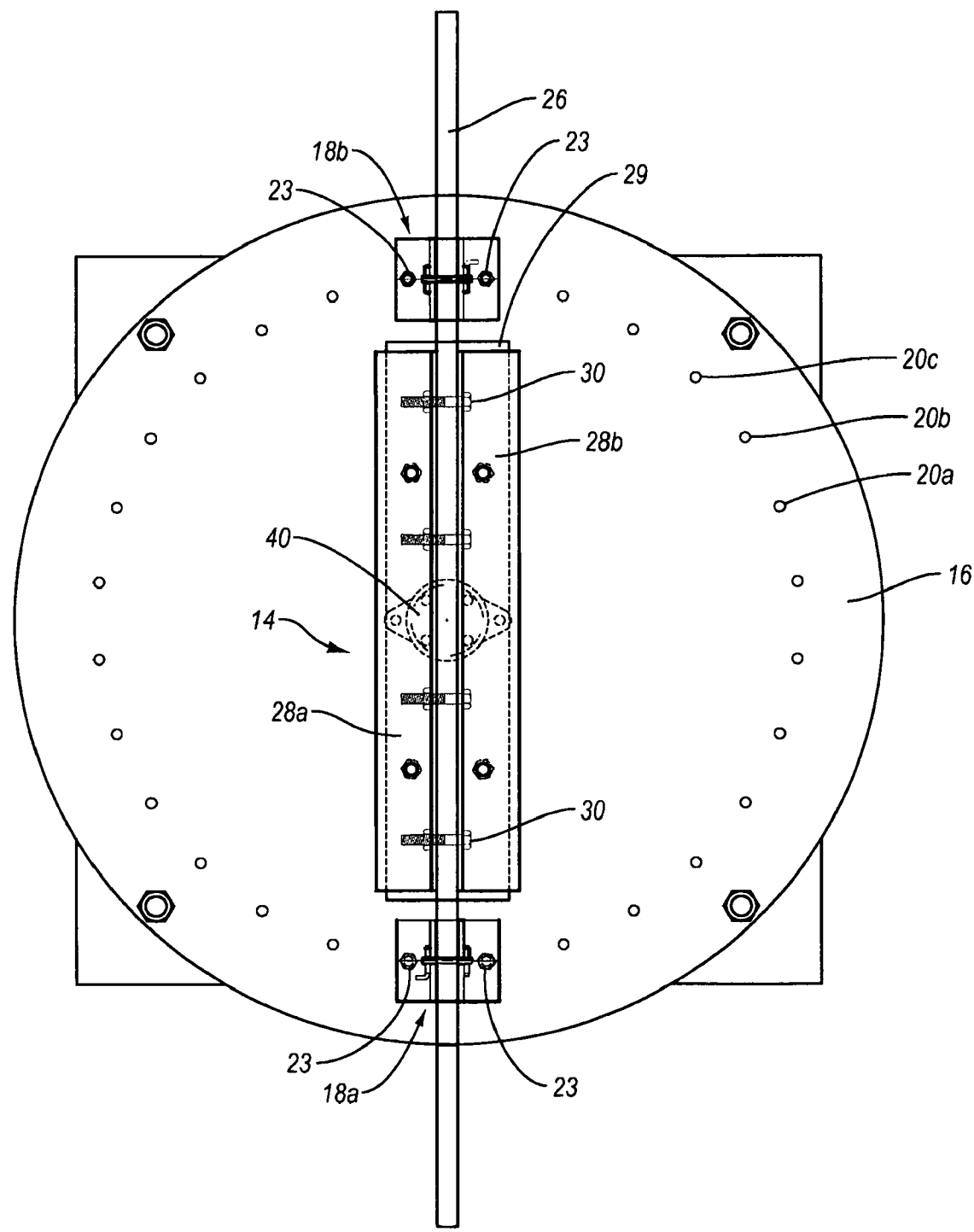
FIG. 3B illustrates a plan view of the rotator clamp and rotator plate shown in FIG. 3A.

FIGS. 3A and 3B further illustrate various additional details of the exemplary rotator clamp 14, rotator plate 16, and resin panel 22 assembly shown in FIGS. 1A-2. For example, FIG. 3A shows that at least one implementation of rotator clamp 14 comprises two L-shaped brackets 28*a*-28*b*. (FIG. 3B illustrates still additional details in a plan view of the same). In general, these brackets 28(*a-b*) will comprise any sufficiently rigid natural or synthetic materials (e.g., metals, plastics, composites) capable of withstanding relatively high mechanical or temperature stresses. FIG. 3A further shows that the brackets 28, in turn, can be positioned and/or otherwise affixed to an extreme end (e.g., lower end) of resin panel 22 via one or more fastener elements 30 (e.g., a screw and nut assembly) of virtually any length.

One will appreciate, therefore, that the combination of L-shaped brackets 28(*a-b*), backing plate 29, and fastener 30 can allow a manufacturer to grip resin panels 22 of virtually any range of thicknesses. For example, a manufacturer can secure a rotator clamp 14 about resin panels 22 of approximately 0.25-0.5 inches (or lower) in thickness to approximately 1 inch thickness, and/or approximately 2 inches (or higher) of thickness in the resin panel 22, as desired. In one implementation, the L-shaped brackets 28 and one or more fasteners 30 of rotator clamp 14 are also or alternatively configured in size and shape to mount to (or otherwise secure) a resin panel 22 with thicknesses ranging from about 0.25 inches thick to about 3 inches thick.

FIG. 3A also shows that a manufacturer can affix L-shaped brackets 28(*a-b*) to a perpendicular backing plate 29. In general, the backing plate 29 is connected to the rotator handle 26 via top plate 40 of spindle assembly 25. In one implementation, the backing plate 29 operates at least in part to stabilize the resin panel 22/22*a* and L-shaped brackets 28 on spindle assembly 25.

Along these lines, FIGS. 3A-3B show that the spindle assembly 25 can include a centralized base plate 34, a middle plate 36, a bushing 38, and a top plate 40. In addition, FIG. 3A shows that an axle 24 can be positioned through each of these components of spindle assembly 25. In at least one implementation, for example, axle 24 is attached directly to top plate 40, while the entire spindle assembly 25 is secured to rotator plate 16 via one or more fastener 32, which pass through the base plate 34 and the rotator plate 16. In the illustrated configuration, the rotator clamp 14 and spindle assembly 25 operate so that the rotator clamp 14, and plates 29 and 40, rotate on (or with) axle 24, while plates 36, 38, and 16 remain in effectively the same position with respect to rotator plate 16.

Figure 4A:
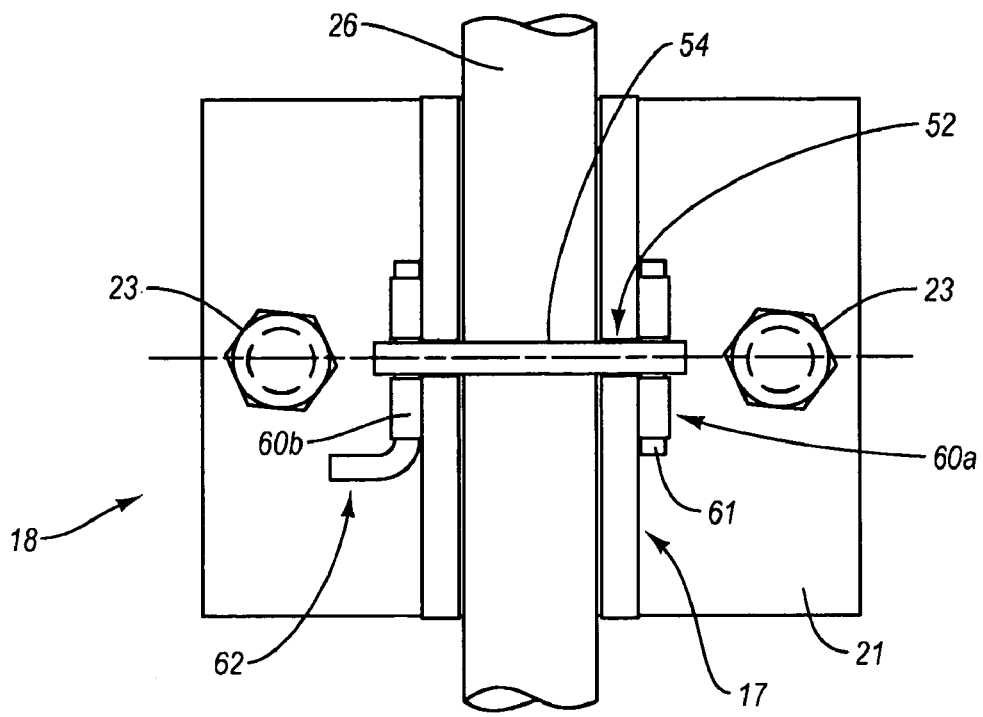
FIG. 4A illustrates a plan view of stopping means according to at least one implementation of the present invention.
Figure 4B:
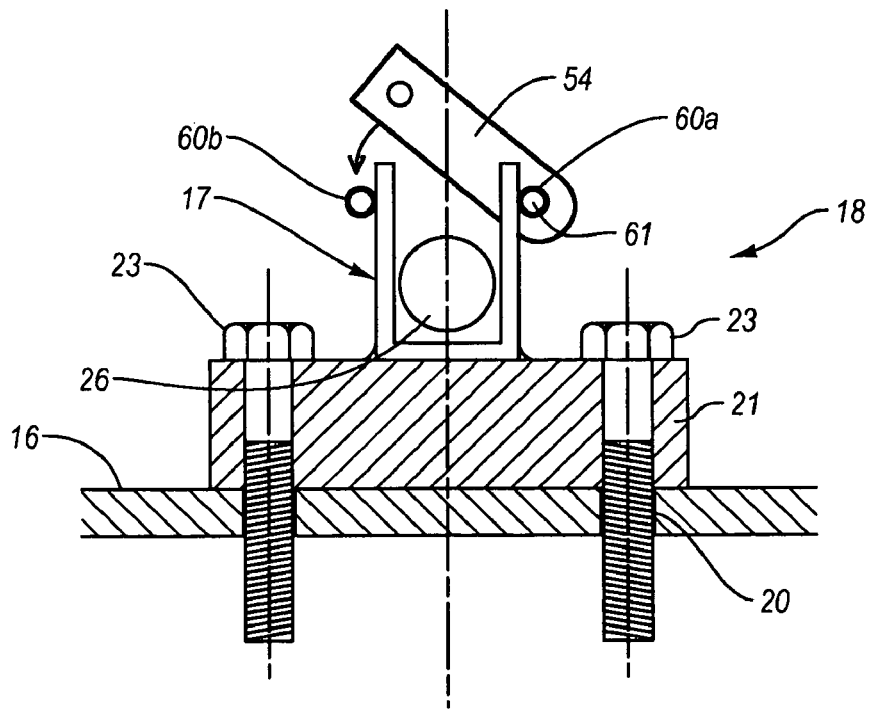
FIG. 4B illustrates a cross-sectional view of the stopping means shown in FIG. 4A.

FIGS. 4A and 4B illustrate additional details with respect to the stopping means 18(*a-b*). For example, FIG. 4A shows that at least one implementation of stopping means 18 can comprise a U-shaped clamp member 17 (or receiving bay) for inserting/receiving the ends (e.g., 27*a-b*) of rotator handle 26, and that clamp member 17 is attached to base 21. FIG. 4A further shows that the upper ends of the U-shaped clamp member 17 can comprise one or more hinge supports 60*a-b* for receiving or otherwise securing a swivel gate 54. In the illustrated implementation, the one or more hinge supports 60*a-b* can be used to hingedly support and/or otherwise receive at least one extreme end of swivel gate 54. For example, one hinge support 60*a* can be used to swivel an end of swivel gate 54 via an additional hinge pin 61, while an opposing hinge support 60*b* can be used to releasably hold the other extreme end of swivel gate 54 using a releasable pin 62.

According to the illustrated embodiment, therefore, the stopping means 18*a*-18*b* can be used to reversibly attach handle 26 to clamp member 17. For example, in at least one implementation, a manufacturer first positions the stopping means 18*a*-18*b* in an appropriate or desired position on rotator plate 16. The manufacturer then positions the extreme ends 27*a-b* of handle 26 into the U-shaped clamp 17 portion of a given rotator stop 18. Thereafter, the manufacturer closes an end of the swivel gate 54, and secures the swivel gate 54 end to the other side of clamp member 17 using releasable pin 62. Thus, when the swivel gate 54 is in the closed position, the swivel gate 54 at least partially occludes the U-shaped clamp 17, and impinges release of that particular end of handle 26.

Figure 5A:
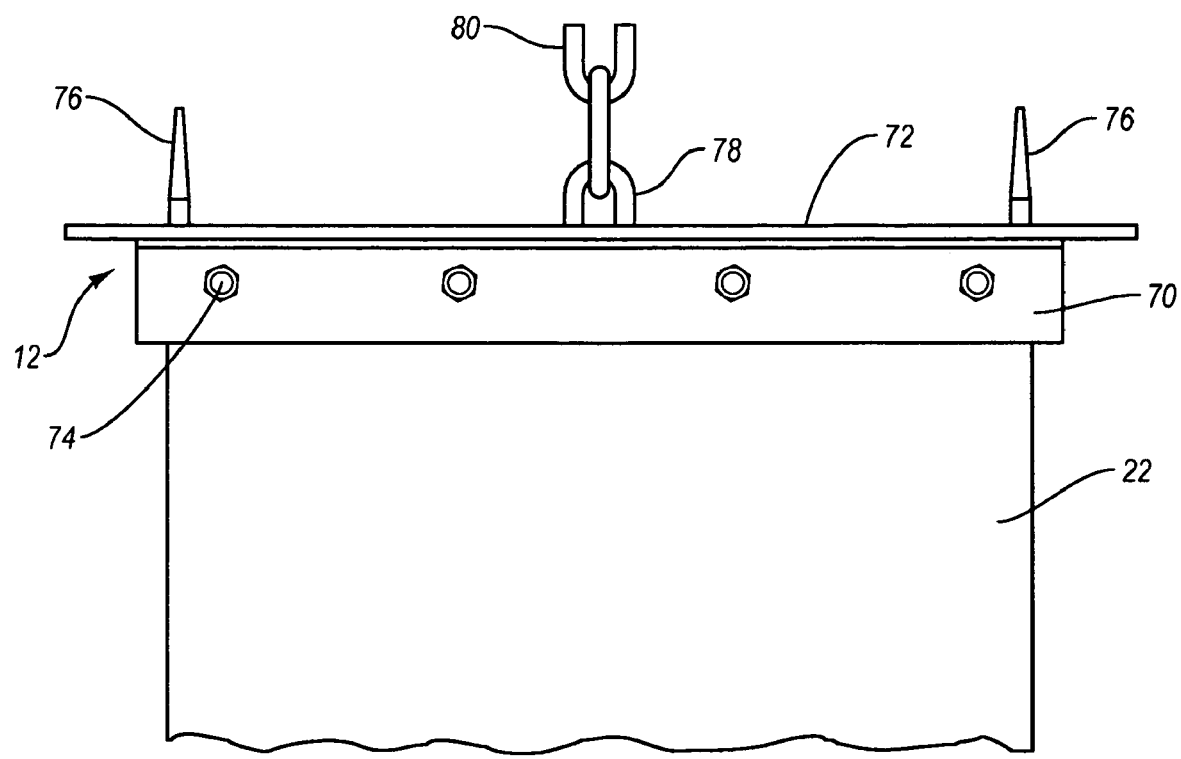
FIG. 5A illustrates a stationary clamp according to one implementation of the present invention, which is used to hold an upper portion of the resin panel during twisting.
Figure 5B:
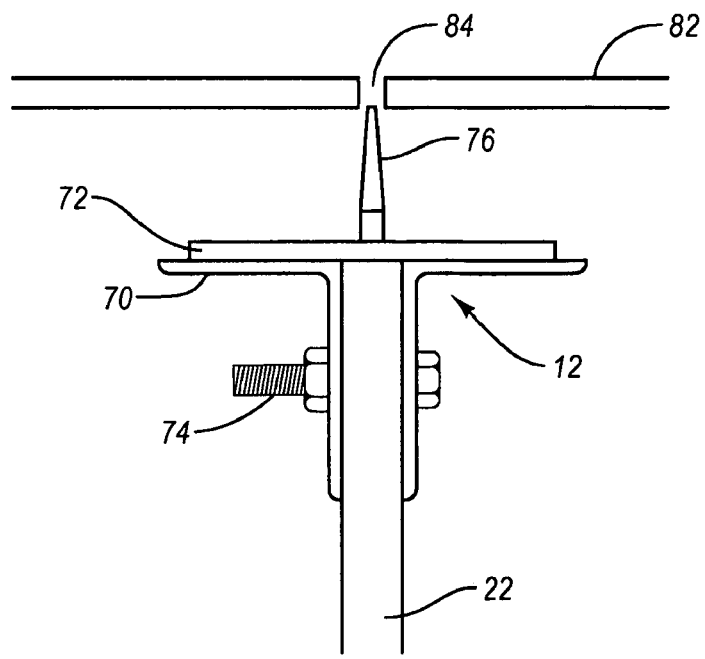
FIG. 5B illustrates a cross-sectional view of the stationary clamp shown in FIG. 5A when positioned with respect to a ceiling-mounted plate in accordance with an implementation of the present invention.
Figure 5C:
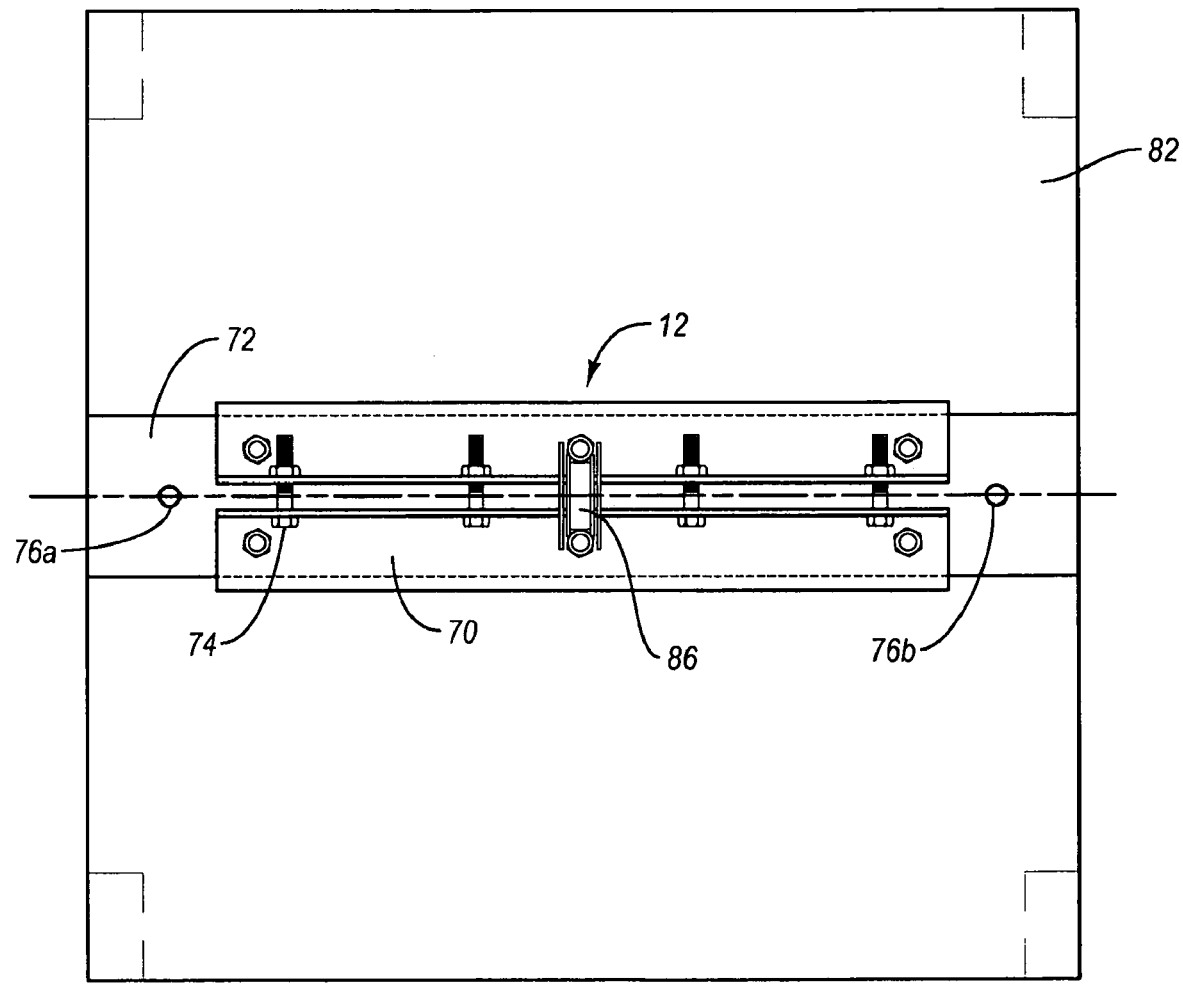
FIG. 5C illustrates a plan view of the stationary clamp when adjacent the ceiling-mounted plate of FIG. 5B.

FIGS. 5A-5C illustrate details of the stationary clamp 12 in conjunction with upper securing means according to at least one embodiment of the present invention. As with the previously illustrated rotator clamp 14, the stationary clamp 12 in FIGS. 5A-5C can comprise two L-shaped brackets 70a-b of sufficiently rigid material (e.g., metal or plastic, retaining rigidity at relatively high mechanical and/or temperature stresses). These L-shaped brackets 70a-b of stationary clamp 12, which are separate, can thus be secured to resin panels 22/22a of virtually any range of thicknesses. For example, depending on the length of the fasteners 74, the L-shaped brackets can be used to grip anywhere from approximately 0.25 (or lower) inches in thickness in a resin panel 22 to approximately 3 (or higher) inches in thickness, as needed.

As also with the rotator clamp 14, the L-shaped brackets 70a-b of stationary clamp 12 can be affixed to a backing plate 72 (e.g., a metal or sufficiently rigid plastic backing plate). The backing plate 72, in turn, can comprise one or more components for lifting and securing the stationary clamp 12 into a particular vertical or horizontal position with respect to other upper securing means components. For example, FIG. 5B shows that backing plate 72 can be positioned adjacent a ceiling plate 82 (FIG. 5B). To this end, FIG. 5A also shows that the backing plate 72 can comprise a lifting means 80 attached via an attachment interface 78 (e.g., a "D-ring").

In at least one implementation, the upper securing means can comprise lifting means 80 consisting essentially of rope, chain, wire, or the like, having sufficient strength to lift a resin panel 22 that is several feet in length. In one implementation, the lifting means 80 can further include one or more pulleys 86 (FIG. 5C) used to lift and hold the resin panel 22/22a in a completely suspended orientation. In general, the lifting means 80 will need to be of sufficient composition and strength to secure the resin panel (i.e., via stationary clamp 12) to attachment interface 78, and hold the resin panel for a period of time (minutes or hours) at a particular height.

For example, FIGS. 5A and 5B show that the lifting means 80 are configured to lift and/or hold a resin panel so that backing plate 72 is ultimately adjacent ceiling plate 82. To this end, FIGS. 5A and 5B further show that the stationary clamp 12 can include one or more alignment pins 76, which can help guide and secure the stationary clamp 12 (and hence upper portion of resin panel 22) into a particular horizontal and/or vertical position with respect to ceiling plate 82. For example, FIG. 5B shows that alignment pins 76 can be configured to pass through one or more perforations 84 in the ceiling plate 82. (Similar such perforations can be included in ceiling plate 82 for channeling lifting means 80.)

Accordingly, at least one implementation of the alignment pins 76 and perforations 84 is that they can be used to guide stationary clamp 12 into a horizontally-stable position. In particular, the alignment pins 76 can hold stationary clamp 12 (and hence upper end of resin panel 22) in a particular horizontal position during horizontal rotation of rotator clamp 14. On the other hand, the alignment pins 76(a-b) can also be configured to move vertically within perforations 84 (despite securing the clamp 12 horizontally) during twisting, and to accommodate length changes of resin panel 22. In particular, one will appreciate that twisting the rotator clamp 14 end of resin panel 22 can shorten the overall length of resin panel 22 to a greater or lesser degree, depending on the gauge and materials used in panel 22. In at least one implementation, therefore, the alignment pins 76 are of sufficient length to slide within perforations 84 while still maintaining a horizontal position, and thus maintain any number of different vertical positions during twisting of rotator clamp 14.

Figure 6A:
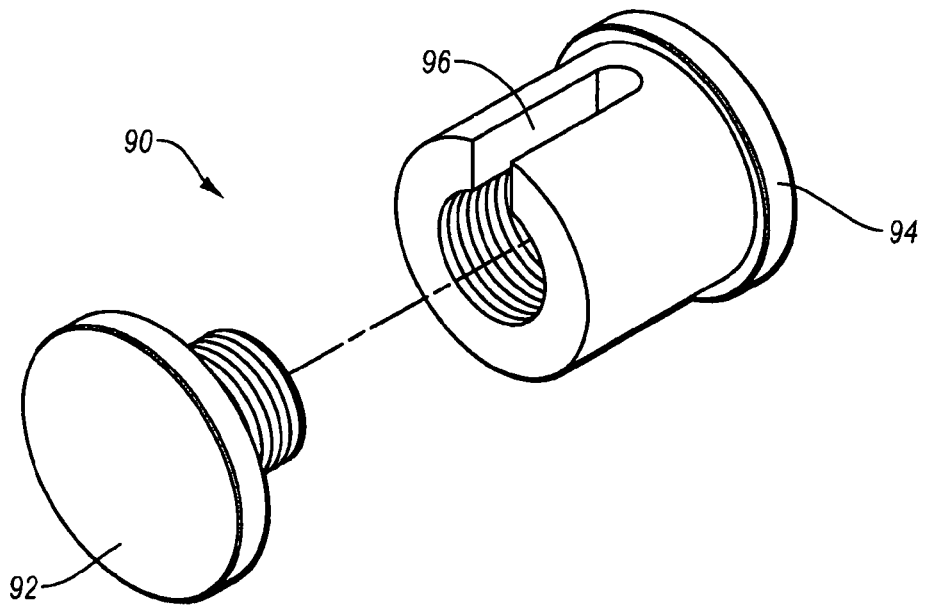
FIG. 6A illustrates an exploded perspective view of a mounting barrel base and mounting barrel cap of a hanger apparatus that can be used to indirectly mount a twisted resin panel in accordance with an implementation of the present invention.
Figure 6B:
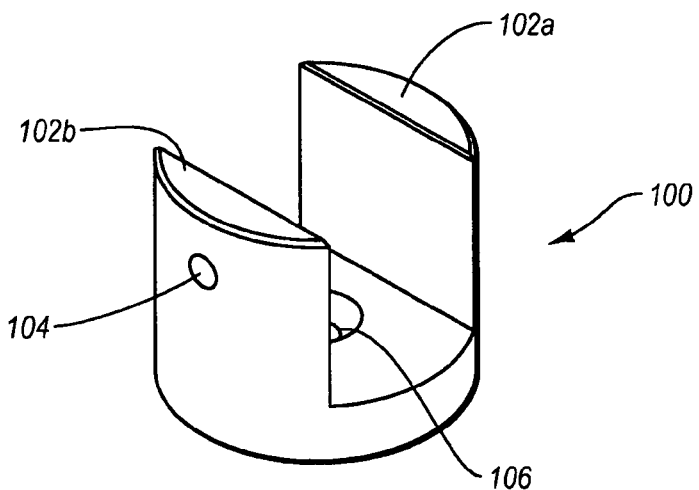
FIG. 6B illustrates a perspective view of a U-shaped mounting member that can be used to directly mount a twisted panel in a location in accordance with an implementation of the present invention.
Figure 6C:
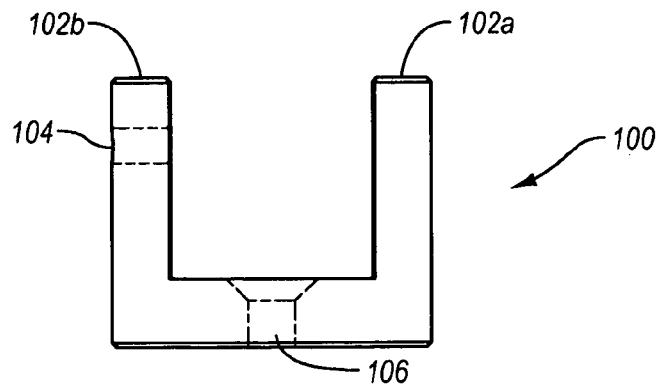
FIG. 6C illustrates a side, cross-sectional view of the U-shaped mounting member shown in FIG. 6B.

In addition to the foregoing, the system(s) 10 in accordance with implementations of the present invention can include a number of different components that can be used to mount a twisted resin panel 22a for use as a partition or display. For example, FIG. 6A illustrates components of a hanger apparatus 90 that can be used by a manufacturer or assembler to indirectly mount, hang, or otherwise secure/hold a twisted resin panel 22a on (or with respect to) a support surface. By contrast, FIGS. 6B-C illustrate various views of a U-shaped mounting bracket 100 that a manufacturer or assembler can use to directly mount an edge of a resin panel 22 to a particular support surface.

As shown in FIG. 6A, a hanger apparatus 90 for indirect mounting can comprise at least a mounting barrel cap 92 and mounting barrel base 94. In at least one implementation, the mounting barrel base 94 further includes a slotted cavity/channel 96 configured to receive a knobbed end (e.g., 112, FIG. 7A) of a knobbed apparatus (e.g., 110, FIG. 7A), and hold the knobbed end within barrel base 94. The mounting barrel base 94 and mounting barrel cap 92 further comprise one or more reciprocal threads for reversible, threaded engagement. As a result, a manufacturer can first position a knobbed portion (e.g., 112) of a knobbed apparatus (e.g., 110) inside the slotted cavity 96 of barrel base 94, and secure the knobbed portion therein by screwing the barrel cap 92 into the mounting barrel base 94.

For example, FIG. 7A illustrates a twisted resin panel 22a that has been perforated in at least two transverse perforations (103a-b) for receiving the components of hanger apparatus 90a. In particular, at least one of the transverse perforations 103a is configured to receive the knobbed end 112 of knobbed apparatus 110 through an edge of the resin panel 22a. By contrast, another of the perforations 103b, which is formed transverse to the other perforation 103a, is configured to receive the components of hanger apparatus 90a as well as the knobbed end 112. Thus, FIG. 7A shows that a manufacturer (or, alternatively the assembler) inserts the knobbed end 112 of knobbed apparatus 110 through perforation 103a, and ultimately into perforation 103b for insertion into hanger apparatus 90a.

Once the knobbed end 112 is inside perforation 103b, the manufacturer (or assembler) can then insert the knobbed end 112 into cavity 96 of barrel base 94a, and secure the knobbed end 112 within barrel base 94a using barrel cap 92a. Upon completion, the knobbed apparatus 110 is appropriately secured within perforation 103b, and can thus be used to mount or otherwise hang the twisted resin panel 22a in a desired position. For example, FIG. 7B shows that two hanger apparatus (with caps 92a-b) are used to loop the knobbed apparatus 110. This allows the manufacturer to hang the twisted resin panel 22 as desired.

As an additional matter, FIGS. 7A and 7B also show that the manufacturer can configure the components of hanger apparatus 90 in size and shape to maintain a flush (or essentially flush) profile with respect to the resin panel 22a surface. This allows a manufacturer to gain the structural benefits of indirect mounting hardware while, at the same time, minimizing any changes to the twisted panel's general aesthetic. Along these lines, one will also appreciate that the hanger apparatus 90 can be made of virtually any naturally or synthetically-occurring material(s) and corresponding finishes as desired for any combination of aesthetic and/or structural ends.

As a further matter, although FIGS. 7A-7B show that the manufacturer or assembler has used essentially one knobbed apparatus 110, one will appreciate that a manufacturer may also implement multiple such knobbed apparatus 110. In particular, an assembler might insert multiple different knobbed ends (e.g., 112) into the cavity 96 of at least one hanger apparatus (e.g., 90a), and corresponding opposing knobbed ends of multiple different knobbed apparatus into still another hanger apparatus. Still further, the knobbed apparatus 110 need not necessarily be a hanging or flexible component, such as illustrated, which might be used simply to hang a twisted panel off of a hook or the like. In particular, the knobbed apparatus 110 could be any number of flexible or rigid materials, and, moreover, the knobbed apparatus 110 could be used not only to simply hang a resin panel, but also or alternatively to mount or position one or more resin panels in conjunction with motorized or otherwise motion-based hanger apparatus (e.g., for spinning or other motion effects).

With respect to direct mounting components/hardware, FIG. 6B illustrates a perspective view of the U-shaped mounting member 100, while FIG. 6C illustrates a side, cross-sectional view of the same. As illustrated, U-shaped mounting member 100 can include a bay (or cavity) formed between walls 102a-b. The bay is generally configured in size and shape for receiving an edge of a resin panel 22, and is further configured in size and shape with a plurality of transverse perforations 104/106 for various mounting purposes. Accordingly, the manufacturer or assembler can use perforation 106 to directly mount the member 100 to a support substrate (e.g., ceiling or floor). The manufacturer can then position an edge of the resin panel 22 within the receiving bay, and further secure the resin panel 22 therein via side perforation 104 (and corresponding fastener(s), not shown).

FIG. 7C illustrates an example of direct mounting using the U-shaped member 100 in at least one implementation. One will appreciate that the manufacturer can use mounting member 100 in combination with (or in lieu of) the mounting apparatus in FIGS. 6A, and 7A-7B. In any case, FIG. 7C illustrates that the manufacturer/assembler has mounted the top and/or bottom edges of the resin panel 22a via mounting members 100a, 100b, 100c, 100d to corresponding ceiling or floor substrates 112a-b.

FIG. 7C further shows that the manufacturer or assembler has further hidden the mounting members 100 and mounting substrates 114 behind one or more additional frame treatments. For example, a manufacturer may desire to hide the U-shaped mounting member 100 in some cases for additional or alternative aesthetic effects. This, of course, is not required, and a manufacturer may alternatively mount the resin panel 22a to a support substrate with U-shaped member 100 in a more visible manner. Accordingly, U-shaped mounting member 100 can comprise any number or type of naturally occurring or synthetic materials (and corresponding finishes) for any desired structural and/or aesthetic ends.

One will appreciate, therefore, that a system for mounting twisted resin panels 22 in one or more locations, therefore, can comprise a number of different apparatus and mounting components. For example, one system for mounting a twisted panel to an upper or lower support can include a twisted resin panel 22a, a mounting barrel base 94, a barrel cap 92, and a knobbed apparatus 110. Similarly, the (or an alternative) system 10 can additionally or alternatively include one or more U-shaped members 100 for mounting a twisted resin panel 22a edge to an upper or lower support surface. In particular, an additional or alternative mounting system 10 can include at least one twisted panel 22a, one or more support surfaces 114a-b, and one or more U-shaped members 100 for mounting the resin panel thereto.

Accordingly, one will appreciate that implementations of the present invention can be used to manufacture relatively-large, twisted resin panels that can be used for a wide range of structural and/or decorative architectural ends. For example, a manufacturer or assembler can create a wall, floor or ceiling partition/treatment with one or more twisted panels of essentially the same twist geometry/aesthetic, and place the partition where desired for functional or aesthetic purposes. In particular, the manufacturer or assembler can produce or arrange a set of resin panels having a twist angle/aesthetic of 120°, and position or mount the twisted resin panels in sequentially arranged mounting positions to create one type of partition.

Alternatively, a manufacturer can create another partition having a series of multiple twisted resin panels 22a, where each twisted panel has one or more twists ranging from about 10° to about 360°, but varying slightly from the next adjacent resin panel 22a. For example, one resin panel has a twist angle of about 120°, while another adjacent resin panel has a twist angle of about 135°, and so forth. Thus, the partition comprises a set of progressively twisted resin panels (not shown), each of which is a slight variation in twisting degree from the next adjacent twisted resin panel. The manufacturer or assembler can then mount (indirectly, directly, or both) the corresponding partition of twisted resin panels 22a in a particular ceiling, wall, or floor location for structural and/or aesthetic ends, as desired. Implementations of the present invention, therefore, provide a number of mechanisms for creating twisted resin panels of a variety of shapes, sizes, and dimensions, particularly without having to use molds of any type.

The present invention may thus be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A resin panel rotation assembly for twisting a resin panel, comprising:
   a resin panel that includes a resin sheet of at least about 4 feet in length in one dimension, and at least about 1 foot in length in a perpendicular dimension;
   a rotator plate mounted to a support surface;
   a rotator clamp mounted to one end of the at least one resin panel on one end, and further rotatably mounted to the rotator plate; and
   lifting means mounted to an opposing end of the at least one resin panel;
   wherein:
   the lifting means are mounted to the opposing end via a stationary clamp; and
   the rotator clamp further comprises a rotator handle configured to rest within stopping means mounted on the rotator plate.

2. The resin panel rotation assembly as recited in claim 1, wherein the stationary clamp is configured to maintain a horizontal position and a variable vertical position of the resin panel during rotation.

3. The resin panel rotation assembly as recited in claim 1, wherein the stopping means comprise:
   a base configured for mounting to the rotator plate; and
   a clamp member mounted to the base, the clamp member configured to receive an end of the rotator handle.

4. The resin panel rotation assembly as recited in claim 1, wherein the stopping means comprise a swivel gate configured to releasable hold the end of the rotator handle in a stable position.

5. The resin panel rotation assembly as recited in claim 1, wherein:
   the rotator plate comprises one or more tracks for guiding the rotator handle and rotator clamp along a circumference of the rotator plate; and
   the rotator clamp is configured in combination with the rotator handle for releasable engagement with one or more recesses or perforations of the rotator plate.

6. The resin panel rotation assembly as recited in claim 1, wherein the rotator clamp and rotator handle are rotatable with respect to the rotator plate via a spindle assembly.

7. The resin panel rotation assembly as recited in claim 1, wherein:
- the rotator plate further comprises a plurality of recesses or perforations formed therein; and
- the plurality of recesses or perforations are spaced from about 10° to about 20° therebetween.

8. A method of preparing a twisted resin panel, comprising:
- heating a resin panel that is at least about 4 feet in one dimension and at least about 1 foot in a perpendicular dimension to a temperature between about 150° to 260° F., wherein at least a portion of the resin panel between two opposing ends is malleable;
- clamping one of the opposing ends of the resin panel with a rotator clamp, and another of the opposing ends with a stationary clamp;
- raising the stationary clamp to an elevated position over a rotator plate, wherein the stationary clamp is in a horizontally-secure position;
- and rotating the rotator clamp with respect to the rotator plate.

9. The method as recited in claim 8, wherein the resin panel comprises a plurality of layers bonded together as a panel, the method further comprising:
- preparing a resin panel assembly that includes a tie layer, a plurality of resin layers, and a decorative image layer positioned adjacent each other;
- heating the plurality of layers in the resin panel assembly in a first heating step to a temperature between about 150° F. to about 210° F. until each of the layers are bonded together; and
- heating the bonded resin panel to a second temperature between about 210° F. to about 260° F. until the resin panel is malleable.

10. The method as recited in claim 8, further comprising cooling the opposing ends of the resin panel before clamping the opposing ends with one of the stationary clamp or the rotator clamp.

11. The method as recited in claim 8, further comprising securing the rotator clamp with respect to the rotator plate in a rotated position, wherein the resin panel is cooled in the rotated position.

12. A partition of one or more twisted resin panels prepared by the process as recited in claim 8, comprising:
- at least one resin panel that is at least about 4 feet in length in one dimension, and at least about 1 foot in length in a perpendicular dimension;
- wherein at least one end of the resin panel has been rotated with respect to an opposing end of the resin panel, such that the resin panel displays a twist aesthetic.

13. The partition as recited in claim 12, wherein the twist aesthetic is at least 180° between the at least one end of the resin panel and the opposing end of the resin panel.

14. The partition as recited in claim 12, wherein the twist aesthetic is at least 270° between the at least one end of the resin panel and the opposing end of the resin panel.

15. The partition as recited in claim 12, wherein the at least one resin panel comprises one or more decorative objects positioned adjacent at least one of a plurality of resin sheets in the resin panel.

16. The partition as recited in claim 12, further comprising:
- a plurality of transverse perforations in the at least one resin panel configured to receive one or more hanger apparatus;
- wherein the at least one resin panel is hung in the partition.

17. The partition as recited in claim 12, further comprising a plurality of twisted resin panels, including the at least one resin panel, mounted therein.

18. The partition as recited in claim 17, wherein the plurality of twisted resin panels are each twisted in a progressively different twist angle with respect to an adjacent resin panel in the partition.

19. A resin panel rotation assembly for twisting a resin panel, comprising:
- a resin panel that includes a resin sheet of at least about 4 feet in length in one dimension, and at least about 1 foot in length in a perpendicular dimension;
- a rotator plate mounted to a support surface;
- a rotator clamp mounted to one end of the at least one resin panel on one end, and further rotatably mounted to the rotator plate; and
- lifting means mounted to an opposing end of the at least one resin panel;
- wherein:
  - the lifting means are mounted to the opposing end via a stationary clamp;
  - the rotator clamp further comprises a rotator handle configured to rest within stopping means mounted on the rotator plate; and
  - the stopping means comprise a base configured for mounting to the rotator plate, and a clamp member mounted to the base, the clamp member configured to receive an end of the rotator handle.

20. A resin panel rotation assembly for twisting a resin panel, comprising:
- a resin panel that includes a resin sheet of at least about 4 feet in length in one dimension, and at least about 1 foot in length in a perpendicular dimension;
- a rotator plate mounted to a support surface;
- a rotator clamp mounted to one end of the at least one resin panel on one end, and further rotatably mounted to the rotator plate; and
- lifting means mounted to an opposing end of the at least one resin panel;
- wherein:
  - the lifting means are mounted to the opposing end via a stationary clamp;
  - the rotator clamp further comprises a rotator handle configured to rest within stopping means mounted on the rotator plate; and
  - the stopping means comprise a swivel gate configured to releasable hold the end of the rotator handle in a stable position.

21. A resin panel rotation assembly for twisting a resin panel, comprising:
- a resin panel that includes a resin sheet of at least about 4 feet in length in one dimension, and at least about 1 foot in length in a perpendicular dimension;
- a rotator plate mounted to a support surface;
- a rotator clamp mounted to one end of the at least one resin panel on one end, and further rotatably mounted to the rotator plate; and
- lifting means mounted to an opposing end of the at least one resin panel;
- wherein:
  - the lifting means are mounted to the opposing end via a stationary clamp;
  - the rotator plate comprises one or more tracks for guiding a rotator handle and rotator clamp along a circumference of the rotator plate; and
  - the rotator clamp is configured in combination with the rotator handle for releasable engagement with one or more recesses or perforations of the rotator plate.

* * * * *